United States Patent
Bonne

(10) Patent No.: US 11,011,100 B2
(45) Date of Patent: May 18, 2021

(54) DYNAMIC PIXEL DIAGNOSTICS FOR A HIGH REFRESH RATE LED ARRAY

(71) Applicant: Lumileds LLC, San Jose, CA (US)

(72) Inventor: Ronald Bonne, Plainfield, IL (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/456,874

(22) Filed: Jun. 28, 2019

(65) Prior Publication Data

US 2020/0084868 A1 Mar. 12, 2020

Related U.S. Application Data

(60) Provisional application No. 62/729,244, filed on Sep. 10, 2018.

(30) Foreign Application Priority Data

Oct. 31, 2018 (EP) ..................................... 18203783

(51) Int. Cl.
| | | |
|---|---|---|
| *G09G 3/20* | (2006.01) | |
| *G09G 3/32* | (2016.01) | |
| *H05B 45/10* | (2020.01) | |
| *H05B 39/04* | (2006.01) | |

(52) U.S. Cl.
CPC ............ *G09G 3/2014* (2013.01); *G09G 3/32* (2013.01); *H05B 39/047* (2013.01); *H05B 45/10* (2020.01); *G09G 2310/0291* (2013.01)

(58) Field of Classification Search
CPC ................... G09G 3/2014; G09G 3/32; G09G 2310/0291; G09G 2370/08; G09G 3/2096; G09G 2330/02; G09G 2380/10; H05B 45/10; H05B 39/047; H05B 45/00

USPC .......................................................... 315/82
See application file for complete search history.

(56) References Cited

U.S. PATENT DOCUMENTS

| | | |
|---|---|---|
| 5,184,114 A | 2/1993 | Brown |
| 6,611,610 B1 | 8/2003 | Stam et al. |
| 6,728,393 B2 | 4/2004 | Stam et al. |
| 6,933,956 B2 | 8/2005 | Sato et al. |
| 7,432,967 B2 | 10/2008 | Bechtel et al. |

(Continued)

FOREIGN PATENT DOCUMENTS

| | | |
|---|---|---|
| CN | 204077513 U | 1/2015 |
| DE | 102015016375 A1 | 6/2017 |

(Continued)

OTHER PUBLICATIONS

U.S. Appl. No. 16/657,475, filed Oct. 18, 2019, Quint Van Voorst Vader.

(Continued)

*Primary Examiner* — Don P Le
(74) *Attorney, Agent, or Firm* — Schwegman Lundberg & Woessner, P.A.

(57) ABSTRACT

A LED controller for an LED pixel array includes a switch K1 activated in response to a row and column select signal; a switch K2 activated in response to a pulse width modulation duty cycle; and a switch K3 providing a current source from Vbias. Pixel activation is determined at least in part by state of switch K1 and K2. In operation, the LED pixel in the LED pixel array is selected by switch K1 and a fault determination for the LED pixel is made based on determined Vf on a Vf bus.

20 Claims, 9 Drawing Sheets

(56) References Cited

U.S. PATENT DOCUMENTS

| | | | |
|---|---|---|---|
| 7,526,103 | B2 | 4/2009 | Schofield et al. |
| 7,542,861 | B1 | 6/2009 | You et al. |
| 9,318,069 | B2 | 4/2016 | Nambi et al. |
| 9,849,827 | B2 | 12/2017 | Uchida et al. |
| 10,148,938 | B2 | 12/2018 | Nagasaki et al. |
| 10,219,348 | B1* | 2/2019 | Chung ............... H05B 45/37 |
| 10,651,357 | B2 | 5/2020 | Andrews |
| 2001/0026646 | A1 | 10/2001 | Morita et al. |
| 2002/0142504 | A1 | 10/2002 | Feldman et al. |
| 2002/0171617 | A1 | 11/2002 | Fuller |
| 2002/0186192 | A1 | 12/2002 | Maruoka et al. |
| 2003/0038983 | A1 | 2/2003 | Tanabe et al. |
| 2003/0055262 | A1 | 3/2003 | Sato et al. |
| 2003/0222893 | A1 | 12/2003 | Koester et al. |
| 2004/0095184 | A1 | 5/2004 | Oka et al. |
| 2004/0114379 | A1 | 6/2004 | Miller et al. |
| 2004/0119667 | A1 | 6/2004 | Yang |
| 2004/0129887 | A1 | 7/2004 | Vydrin et al. |
| 2004/0252874 | A1* | 12/2004 | Yamazaki ............... H04N 5/367 382/132 |
| 2005/0029872 | A1 | 2/2005 | Ehrman et al. |
| 2006/0007059 | A1 | 1/2006 | Bell |
| 2006/0017688 | A1 | 1/2006 | Hohmann et al. |
| 2006/0237636 | A1 | 10/2006 | Lyons et al. |
| 2007/0242337 | A1 | 10/2007 | Bradley |
| 2008/0129206 | A1 | 6/2008 | Stam et al. |
| 2009/0040152 | A1* | 2/2009 | Scheibe ............... G06F 3/1446 345/82 |
| 2009/0040775 | A1* | 2/2009 | Scheibe ............... G09F 9/33 362/373 |
| 2009/0322429 | A1 | 12/2009 | Ivanov et al. |
| 2010/0073358 | A1 | 3/2010 | Ozaki |
| 2010/0097525 | A1 | 4/2010 | Mino |
| 2010/0259182 | A1 | 10/2010 | Man et al. |
| 2010/0301777 | A1 | 12/2010 | Kraemer |
| 2011/0012891 | A1 | 1/2011 | Cheng et al. |
| 2011/0062872 | A1 | 3/2011 | Jin et al. |
| 2012/0286135 | A1 | 11/2012 | Gong et al. |
| 2012/0287144 | A1 | 11/2012 | Gandhi et al. |
| 2012/0306370 | A1 | 12/2012 | Ven et al. |
| 2013/0082604 | A1* | 4/2013 | Williams ............... H05B 45/50 315/130 |
| 2014/0267329 | A1 | 9/2014 | Lee et al. |
| 2015/0138212 | A1 | 5/2015 | Bae et al. |
| 2015/0151671 | A1 | 6/2015 | Refior et al. |
| 2015/0186098 | A1 | 7/2015 | Hall |
| 2015/0204512 | A1 | 7/2015 | Chen et al. |
| 2016/0081028 | A1 | 3/2016 | Chang et al. |
| 2016/0081148 | A1* | 3/2016 | Liang ............... H05B 45/50 324/414 |
| 2016/0104418 | A1 | 4/2016 | Keum et al. |
| 2016/0155406 | A1 | 6/2016 | Lee |
| 2016/0275919 | A1 | 9/2016 | Lawrence et al. |
| 2016/0302270 | A1 | 10/2016 | Wang |
| 2016/0335957 | A1 | 11/2016 | Fu et al. |
| 2016/0345392 | A1 | 11/2016 | Scenini et al. |
| 2017/0243532 | A1 | 8/2017 | Huang et al. |
| 2018/0074199 | A1 | 3/2018 | Lin et al. |
| 2018/0079352 | A1 | 3/2018 | Dalal |
| 2019/0013307 | A1 | 1/2019 | Wu et al. |
| 2019/0057643 | A1 | 2/2019 | Bae et al. |
| 2019/0132917 | A1* | 5/2019 | Veenstra ............... G01R 31/44 |
| 2019/0189879 | A1 | 6/2019 | Tandon et al. |
| 2020/0079278 | A1 | 3/2020 | Bonne et al. |
| 2020/0079280 | A1* | 3/2020 | Bonne ............... B60Q 1/143 |
| 2020/0082503 | A1 | 3/2020 | Bonne et al. |
| 2020/0082749 | A1 | 3/2020 | Bonne |
| 2020/0084848 | A1 | 3/2020 | Bonne et al. |
| 2020/0084853 | A1 | 3/2020 | Bonne et al. |
| 2020/0084854 | A1 | 3/2020 | Bonne et al. |
| 2020/0084868 | A1 | 3/2020 | Bonne |
| 2020/0128640 | A1 | 4/2020 | Van Voorst |

FOREIGN PATENT DOCUMENTS

| | | | |
|---|---|---|---|
| EP | 2626851 | A2 | 8/2013 |
| JP | 2002247614 | A | 8/2002 |
| KR | 101846329 | B1 | 4/2018 |
| TW | 201110811 | A | 3/2011 |
| WO | 2009140963 | A1 | 11/2009 |
| WO | 2013/066017 | A1 | 5/2013 |
| WO | 2014062425 | A1 | 4/2014 |
| WO | 2020053716 | A1 | 3/2020 |
| WO | 2020053717 | A1 | 3/2020 |
| WO | 2020053718 | A2 | 3/2020 |
| WO | 2020053719 | A1 | 3/2020 |

OTHER PUBLICATIONS

U.S. Appl. No. 62/888,246, filed Aug. 16, 2019, Zhi Hua Song.
U.S. Appl. No. 62/890,853, filed Aug. 23, 2019, Toni Lopez.
U.S. Appl. No. 62/938,479, filed Nov. 21, 2019, Zhi Hua Song.
U.S. Appl. No. 62/938,527, filed Nov. 21, 2019, Zhi Hua Song.
U.S. Appl. No. 62/941,123, filed Nov. 27, 2019, Ronald Johannes Bonne.
U.S. Appl. No. 62/951,199, filed Dec. 20, 2019, Zhi Hua Song.
European Search Report corresponding to EP18201763; dated Feb. 8, 2019, 1 page.
European Search Report corresponding to EP18202319, dated Jan. 29, 2019, 1 page.
European Search Report corresponding to EP18203445, dated Apr. 5, 2019, 1 page.
International Search Report and Written Opinion in International Patent Application No. PCT/IB2019/057507 dated Apr. 16, 2020, 31 pages.
International Search Report and Written Opinion in International Patent Application No. PCT/IB2019/057506, 14 pages, dated Oct. 31, 2019.
International Search Report, PCT/IB2019/057504, dated Nov. 11, 2019, 3 pages.
USPTO Non-Final Office Action in U.S. Appl. No. 16/456,868 dated Apr. 1, 2020, 8 pages.
USPTO Non-Final Office Action dated Feb. 20, 2020 for. U.S. Appl. No. 16/456,858; 10 pages.
USPTO Non-Final Office Action dated Mar. 6, 2020 for. U.S. Appl. No. 16/456,862; 23 pages.
USPTO Notice of Allowance in U.S. Appl. No. 16/456,835 dated Jan. 27, 2020, 8 pages.
USPTO office action issued in U.S. Appl. No. 16/456,844 dated Feb. 5, 2020; 16 pages.
Written Opinion of the International Searching Authority, PCT/IB2019/057504, dated Nov. 11, 2019, 5 pages.
European Search Report corresponding to EP18203783, dated Mar. 4, 2019, 1 page.
Taiwanese Office Action dated May 25, 2020 for ROC (Taiwan) Patent Application No. 108123756; with English translation; 48 pages total.
USPTO Non-Final Office Action dated Jun. 11, 2020 for U.S. Appl. No. 16/456,835; 19 pages.
Written Opinion of the International Searching Authority corresponding to PCT/IB2019/057508, dated Nov. 4, 2019, 10 pages.
International Search Report corresponding to PCT/IB2019/057508, dated Nov. 4, 2019, 4 pages.
Taiwanese Office Action dated Jun. 29, 2020 for ROC (Taiwan) Patent Application No. 108123758; 11 pages total.
Taiwanese Office Action dated May 13, 2020 for ROC (Taiwan) Patent Application No. 108123755, with English translation; 18 pages total.
USPTO Final Office Action in U.S. Appl. No. 16/456,862 dated Sep. 14, 2020, 15 pages.
USPTO Final Office Action dated Oct. 15, 2020 for. U.S. Appl. No. 16/456,868; 11 pages.
USPTO Non-Final Office Action in U.S. Appl. No. 16/456,849 dated Oct. 29, 2020, 10 pages.
USPTO Notice of Allowance in U.S. Appl. No. 16/456,835 dated Oct. 8, 2020, 8 pages.

(56) References Cited

OTHER PUBLICATIONS

USPTO Notice of Allowance in U.S. Appl. No. 16/456,858 dated Aug. 28, 2020, 6 pages.
USPTO Notice of Allowance in U.S. Appl. No. 16/456,844 dated Aug. 6, 2020, 24 pages.
"Taiwanese Application Serial No. 108123755, Notice dated Aug. 26, 2020", (w/ English Translation), 6 pgs.
"U.S. Appl. No. 16/456,868, Response filed Jul. 1, 2020 to Non Final Office Action dated Apr. 1, 2020", 7 pgs.
"Taiwanese Application Serial No. 108123758, Response filed Sep. 29, 2020 to Office Action dated Jun. 29, 2020", 23 pgs.
"U.S. Appl. No. 16/456,868, Response filed Dec. 15, 2020 to Final Office Action dated Oct. 15, 2020", 9 pgs.

* cited by examiner

DYNAMIC PIXEL DIAGNOSTICS FOR A HIGH REFRESH RATE LED ARRAY

CROSS REFERENCE TO RELATED APPLICATIONS

This application claims benefit of priority to European Patent Application No. 18203783.8 filed Oct. 31, 2018 and to U.S. Provisional Patent Application No. 62/729,244 filed Sep. 10, 2018, each of which is incorporated herein by reference in its entirety.

TECHNICAL FIELD

The present disclosure relates generally to a microcontroller with external data image inputs that is able to support an addressable LED pixel array at high speed image refresh speeds.

BACKGROUND

While pixel arrays of LEDs with supporting CMOS circuitry have been used, practical implementations suitable for commercial use can face severe manufacture, power, and data management problems. Individual light intensity of thousands of emitting pixels may need to be controlled at refresh rates of 30-60 Hz. High data refresh rates are needed for many applications, and systems that support a variety of calibration, testing, and control methodologies are needed.

SUMMARY

In one embodiment, a LED controller includes an image buffer to hold image data. An LED pixel forming a part of a large pixel array is activatable in response to image data, LDO state, and pulse width modulation module state. A logic module including a pixel diagnostic mode using an LDO bypass is connected to modify LDO state and allow direct addressing of the LED pixel for diagnostic purposes without needing to use image data from the image buffer.

In one embodiment, the image buffer is effectively disconnected from the LED pixel when the LDO bypass is activated.

In another embodiment, a pulse width modulator is connected between the image frame buffer and the LED pixel. The pulse wide modulator can have duty cycle loaded during a read of the image buffer. In other embodiments, the pulse width modulator supports configurable per pixel leading edge phase shift.

A row select and a column select are used to select the particular LED pixel for activation when using LDO bypass. The LED pixel can be supplied with a data line, a bypass line, PWMOSC line, a $V_{bias}$ line, and a $V_f$ line.

In another embodiment, an LED controller for an LED pixel array includes a switch K1 activated in response to a row and column select signal; a switch K2 activated in response to a pulse width modulation duty cycle; and a switch K3 providing a current source from Vbias. Pixel activation is determined at least in part by state of switch K1 and K2. In operation, the LED pixel in the LED pixel array is selected by switch K1 and a fault determination for the LED pixel is made based on determined Vf on a Vf bus.

In another embodiment an LED controller for an LED pixel array includes logic providing a row and column select signal; a pulse width modulator having a duty cycle; and a LED pixel in the LED pixel array that is activated at least in part according to state of the row and column select signal and the duty cycle of the pulse width modulator. Fault determination for the LED pixel is made based on determined Vf on a Vf bus.

DETAILED DESCRIPTION

Figure 1:
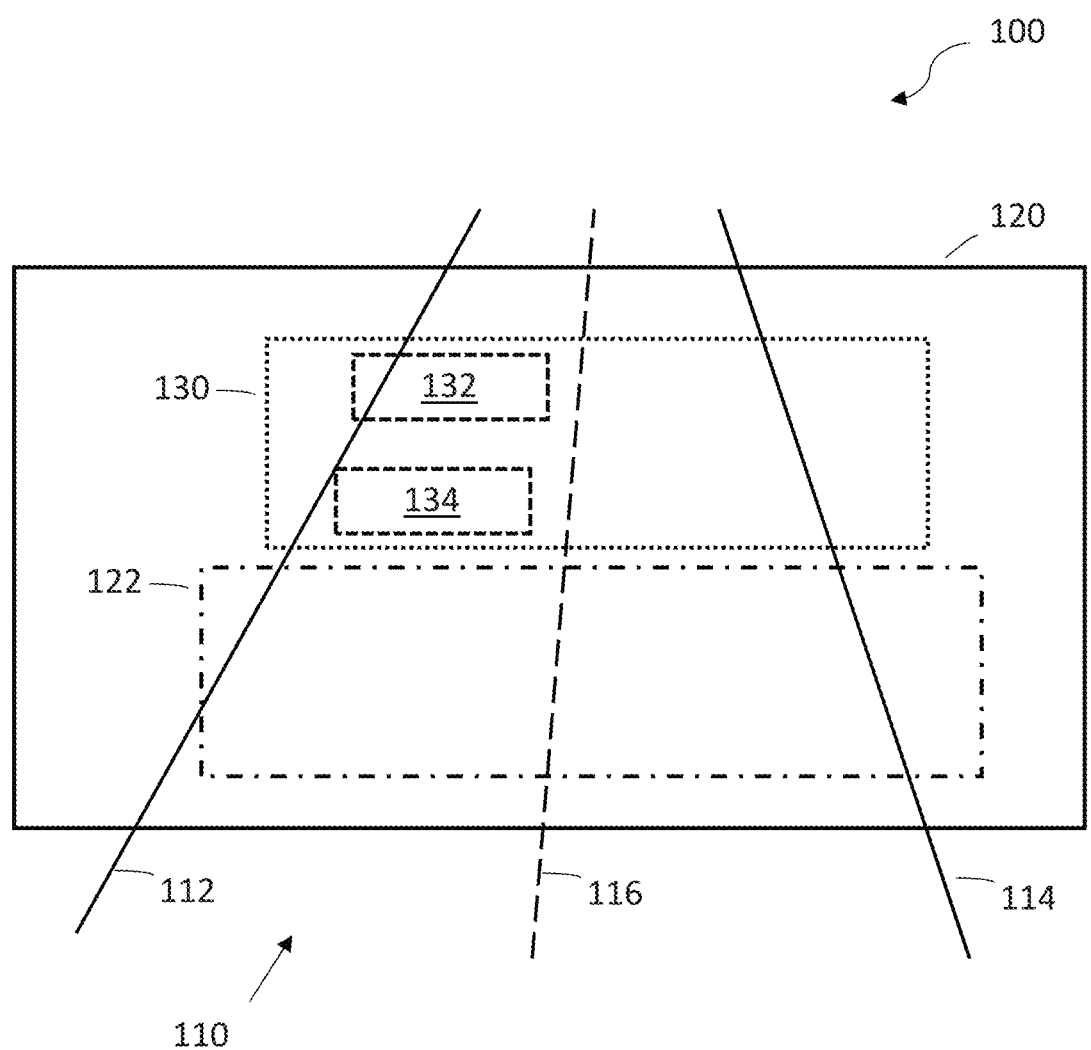
FIG. 1 is a diagram illustrating illumination of a road in discrete sectors using an active headlamp.

Light emitting pixel arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting array may be used to mimic various street light types, allowing, for example, switching between a Type I linear street light and a Type IV semicircular street light by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

One high value application for light emitting arrays is illustrated with respect to FIG. 1, which shows potential roadway illumination pattern 100 for a vehicle headlamp system illuminating a region 120 in front of a vehicle. As illustrated, a roadway 110 includes a left edge 112, a right edge 114, and a centerline 116. In this example, two major regions are illuminated—a downward directed statically illuminated region 122 and a dynamically illuminated region 130. Light intensity within region 130 can be dynamically controlled. For example, as an oncoming vehicle (not shown) traveling between centerline 116 and left edge 112 moves into a subregion 132, light intensity can be reduced or shut off completely. As the oncoming vehicle moves toward subregion 134, a series of subregions (not shown) can be defined to also have reduced light intensity, reducing the chance of unsafe dazzle or glare. As will be appreciated, in other embodiments, light intensity can be increased to accentuate road signs or pedestrians, or spatial illumination patterns adjusted to allow, for example, dynamic light tracking of curved roadways.

Figure 2:
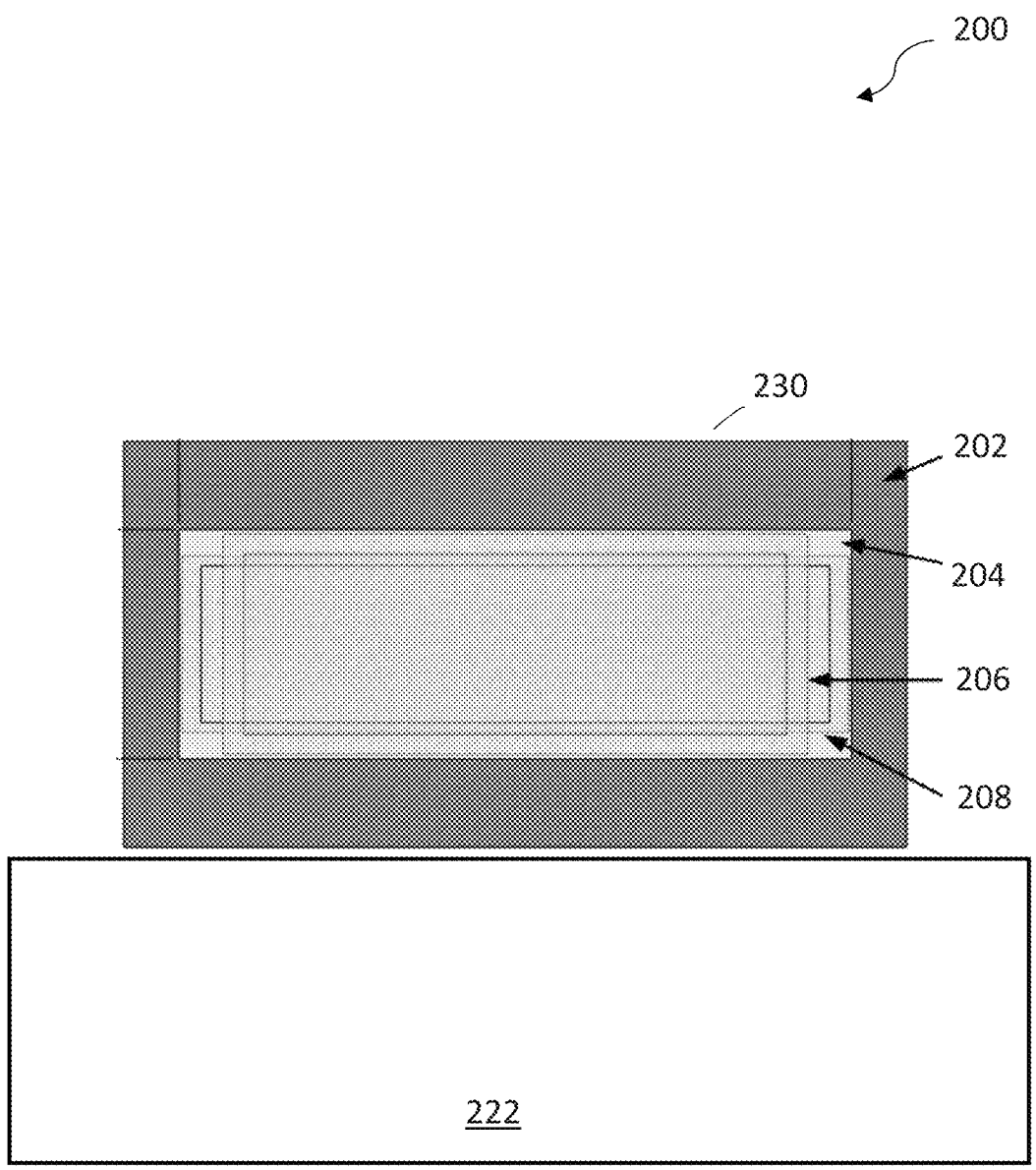
FIG. 2 illustrates a dynamic pixel addressable lighting module positioned adjacent to a static lighting module.

FIG. 2 illustrates a positioning of lighting modules 200 able to provide a lighting pattern such as discussed with respect to FIG. 1. An LED light module 222 can include LEDS, alone or in conjunction with primary or secondary optics, including lenses or reflectors. To reduce overall data management requirements, the light module 222 can be limited to on/off functionality or switching between relatively few light intensity levels. Pixel level control of light intensity is not necessarily supported.

Positioned adjacent to LED light module 22 is an active LED array 230. The LED array includes a CMOS die 202, with a pixel area 204 and alternatively selectable LED areas 206 and 208. The pixel area 204 can have 104 rows and 304 columns, for a total of 31,616 pixels distributed over an area of 12.2 by 4.16 millimeters. The selectable LED areas 206 and 208 allow for differing aspect ratios suitable for different vehicle headlamps or applications to be selected. For example, in one embodiment selectable LED area 206 can have a 1:3 aspect ratio with 82 rows and 246 columns, for a total of 20,172 pixels distributed over an area of 10.6 by 4 millimeters. Alternatively, selectable LED area 208 can have a 1:4 aspect ratio with 71 rows and 284 columns, for a total of 20,164 pixels distributed over an area of 12.1 by 3.2 millimeters. In one embodiment, pixels can be actively managed to have a 10-bit intensity range and a refresh rate of between 30 and 100 Hz, with a typical operational refresh rate of 60 Hz or greater.

Figure 3A:
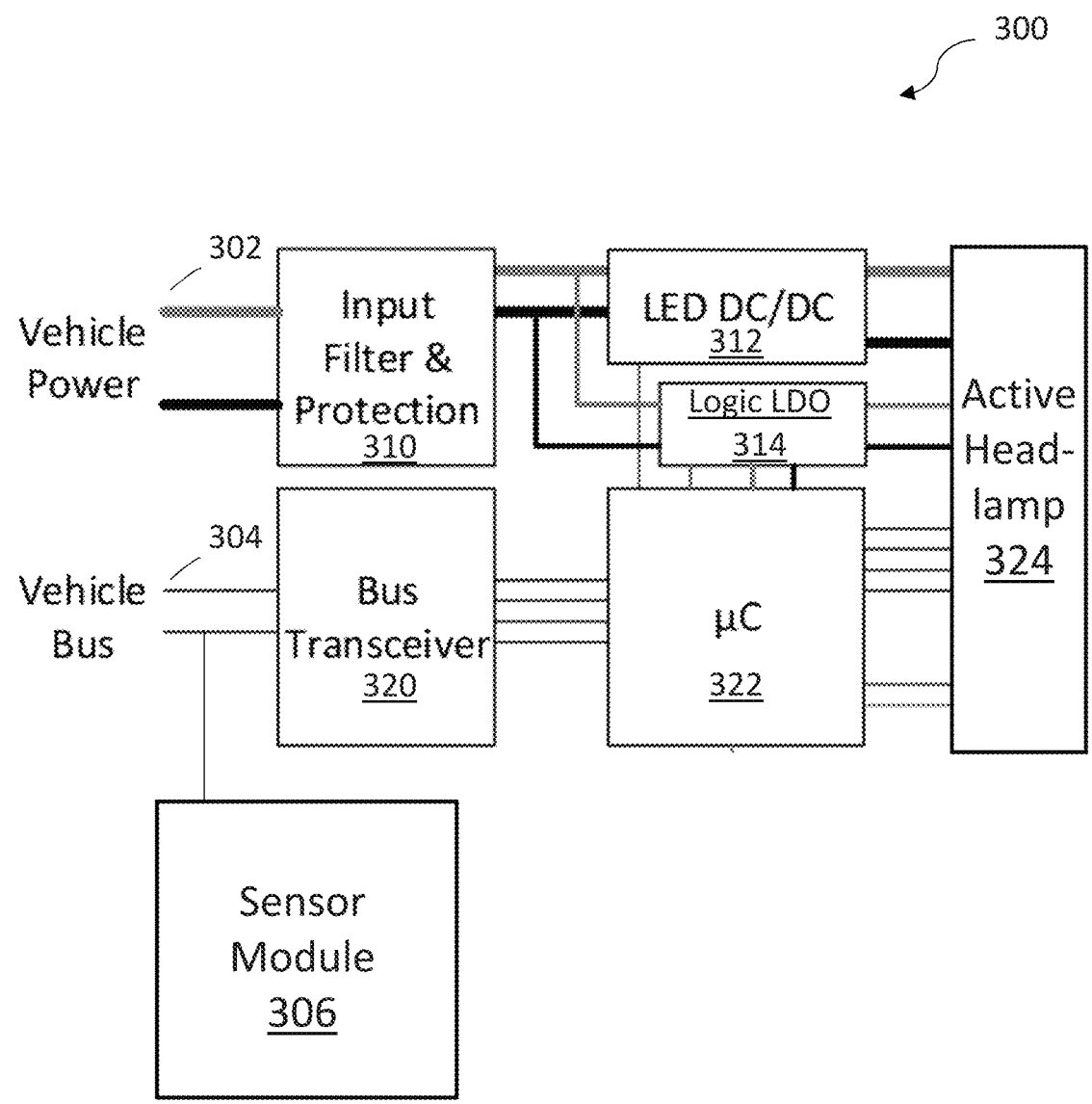
FIG. 3A is one embodiment of a vehicle headlamp system for controlling an active headlamp.

FIG. 3A illustrates an embodiment of a vehicle headlamp system 300 including a vehicle supported power (302) and control system including a data bus (304). A sensor module 306 can be connected to the data bus 304 to provide data related to environment conditions (e.g. time of day, rain, fog, ambient light levels, etc), vehicle condition (parked, in-motion, speed, direction), or presence/position of other vehicles or pedestrians. A separate headlamp controller 330 can be connected to the vehicle supported power and control system.

The vehicle headlamp system 300 can include a power input filter and control module 310. The module 310 can support various filters to reduce conducted emissions and provide power immunity. Electrostatic discharge (ESD) protection, load-dump protection, alternator field decay protection, and reverse polarity protection can also be provided by module 310.

Filtered power can be provided to a LED DC/DC module 312. Module 312 can be used only for powering LEDs, and typically has an input voltage of between 7 and 18 volts, with a nominal 13.2 volts. Output voltage can be set to be slightly higher (e.g. 0.3 volts) than LED array max voltage as determined by factory or local calibration, and operating condition adjustments due to load, temperature or other factors.

Filtered power is also provided to a logic LDO module 314 that can be used to power microcontroller 322 or CMOS logic in the active headlamp 330.

The vehicle headlamp system 300 can also include a bus transceiver 320 (e.g. with a UART or SPI interface) connected to microcontroller 322. The microcontroller 322 can translate vehicle input based on or including data from the sensor module 306. The translated vehicle input can include a video signal that is transferrable to an image buffer in the active headlamp module 324. In addition, the microcontroller 322 can load default image frames and test for open/short pixels during startup. In one embodiment, a SPI Interface loads an image buffer in CMOS. Image frames can be full frame, differential or partial. Other microcontroller 322 features can include control interface monitors of CMOS status, including die temperature, as well as logic LDO output. In some embodiments, LED DC/DC output can be dynamically controlled to minimize headroom. In addition to providing image frame data, other headlamp functions such as complementary use in conjunction with side marker or turn signal lights, and/or activation of daytime running lights can also be controlled.

Figure 3B:
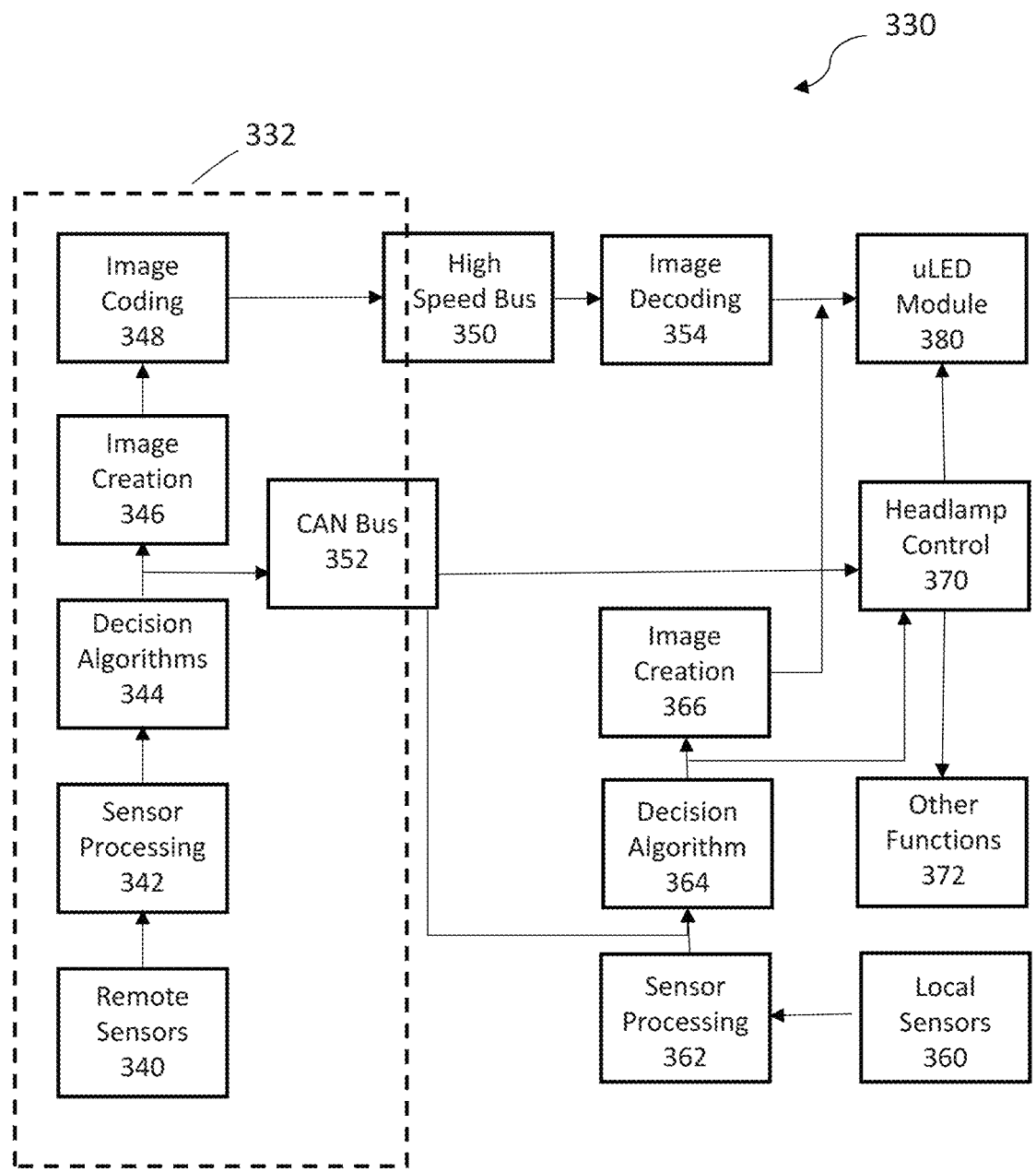
FIG. 3B is one embodiment of a vehicle headlamp system for controlling an active headlamp with connections to vehicle processing output.

FIG. 3B illustrates one embodiment of various components and modules of a vehicle headlamp system 330 capable of accepting vehicle sensor inputs and commands, as well as commands based on headlamp or locally mounted sensors. As seen in FIG. 3B, vehicle mounted systems can include remote sensors 340 and electronic processing modules capable of sensor processing 342. Processed sensor data can be input to various decision algorithms in a decision algorithm module 344 that result in command instructions or pattern creation based at least in part on various sensor input conditions, for example, such as ambient light levels, time of day, vehicle location, location of other vehicles, road conditions, or weather conditions. As will be appreciated, useful information for the decision algorithm module 344 can be provided from other sources as well, including connections to user smartphones, vehicle to vehicle wireless connections, or connection to remote data or information resources.

Based on the results of the decision algorithm module 344, image creation module 346 provides an image pattern that will ultimately provide an active illumination pattern to the vehicle headlamp that is dynamically adjustable and suitable for conditions. This created image pattern can be encoded for serial or other transmission scheme by image coding module 348 and sent over a high speed bus 350 to an image decoding module 354. Once decoded, the image pattern is provided to the uLED module 380 to drive activation and intensity of illumination pixels.

In some operational modes, the system 330 can be driven with default or simplified image patterns using instructions provided to a headlamp control module 370 via connection of the decision algorithm module 344 through a CAN bus 352. For example, an initial pattern on vehicle start may be a uniform, low light intensity pattern. In some embodiments, the headlamp control module can be used to drive other functions, including sensor activation or control.

In other possible operational modes, the system 330 can be driven with image patterns derived from local sensors or commands not requiring input via the CAN bus 352 or high speed bus 350. For example, local sensors 360 and electronic processing modules capable of sensor processing 362 can be used. Processed sensor data can be input to various decision algorithms in a decision algorithm module 364 that result in command instructions or pattern creation based at least in part on various sensor input conditions, for example, such as ambient light levels, time of day, vehicle location, location of other vehicles, road conditions, or weather conditions. As will be appreciated, like vehicle supported remote sensors 340, useful information for the decision algorithm module 364 can be provided from other sources as well, including connections to user smartphones, vehicle to vehicle wireless connections, or connection to remote data or information resources.

Based on the results of the decision algorithm module 364, image creation module 366 provides an image pattern that will ultimately provide an active illumination pattern to the vehicle headlamp that is dynamically adjustable and suitable for conditions. In some embodiments, this created image pattern does not require additional image coding/decoding steps but can be directly sent to the uLED module 380 to drive illumination of selected pixels.

Figure 4:
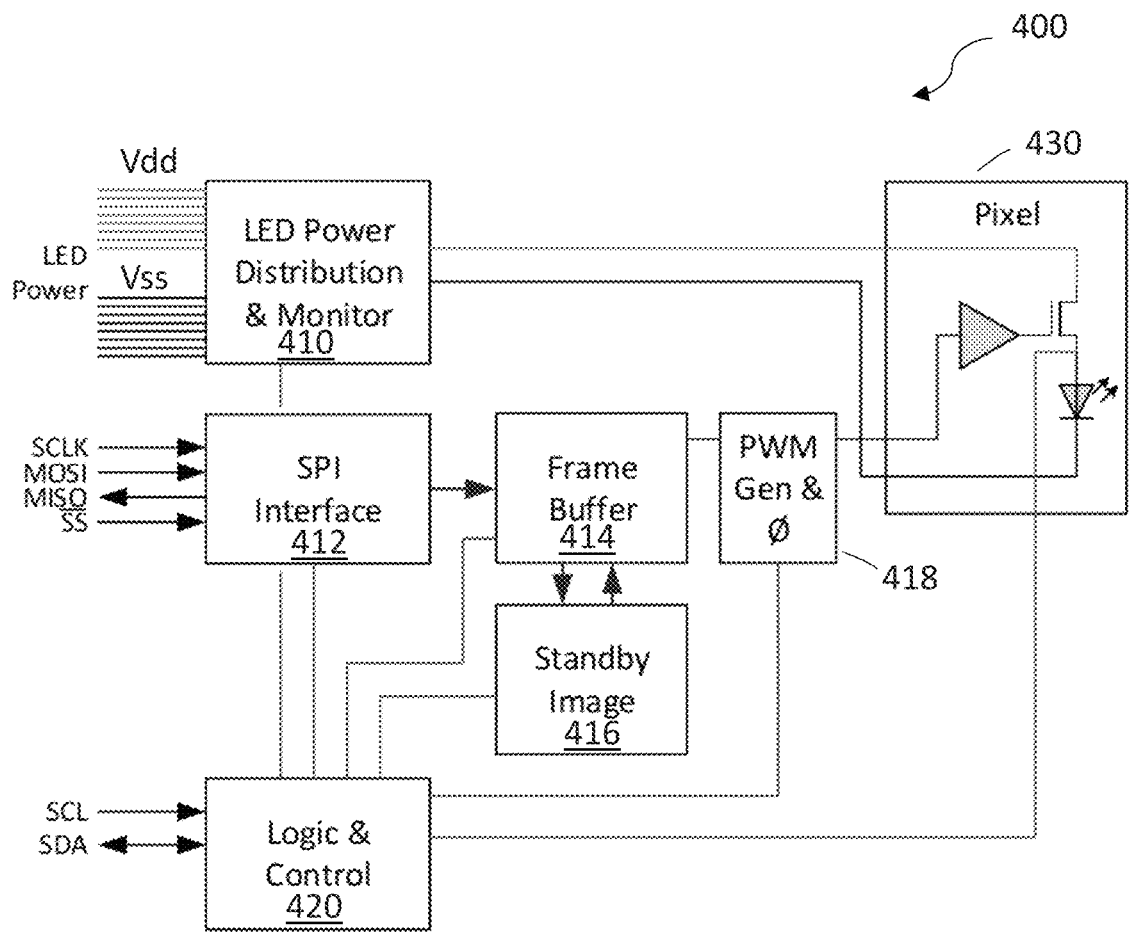
FIG. 4 is a schematic illustration of one embodiment of an active headlamp controller.

FIG. 4 illustrates one embodiment of various components and modules of an active headlamp system 400 such as described with respect to active headlamp 330 of FIG. 3. As illustrated, internal modules include an LED power distribution and monitor module 410 and a logic and control module 420.

Image or other data from the vehicle can arrive via an SPI interface 412. Successive images or video data can be stored in an image frame buffer 414. If no image data is available, one or more standby images held in a standby image buffer can be directed to the image frame buffer 414. Such standby images can include, for example, an intensity and spatial pattern consistent with legally allowed low beam headlamp radiation patterns of a vehicle.

In operation, pixels in the images are used to define response of corresponding LED pixels in the pixel module 430, with intensity and spatial modulation of LED pixels being based on the image(s). To reduce data rate issues, groups of pixels (e.g. 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module 418, each pixel in the pixel module can be operated to emit light in a pattern and with an intensity at least partially dependent on the image held in the image frame buffer 414.

In one embodiment, intensity can be separately controlled and adjusted by setting appropriate ramp times and pulse width for each LED pixel using logic and control module 420 and the pulse width modulation module 418. This allows staging of LED pixel activation to reduce power fluctuations, and to provide various pixel diagnostic functionality.

Figure 5:
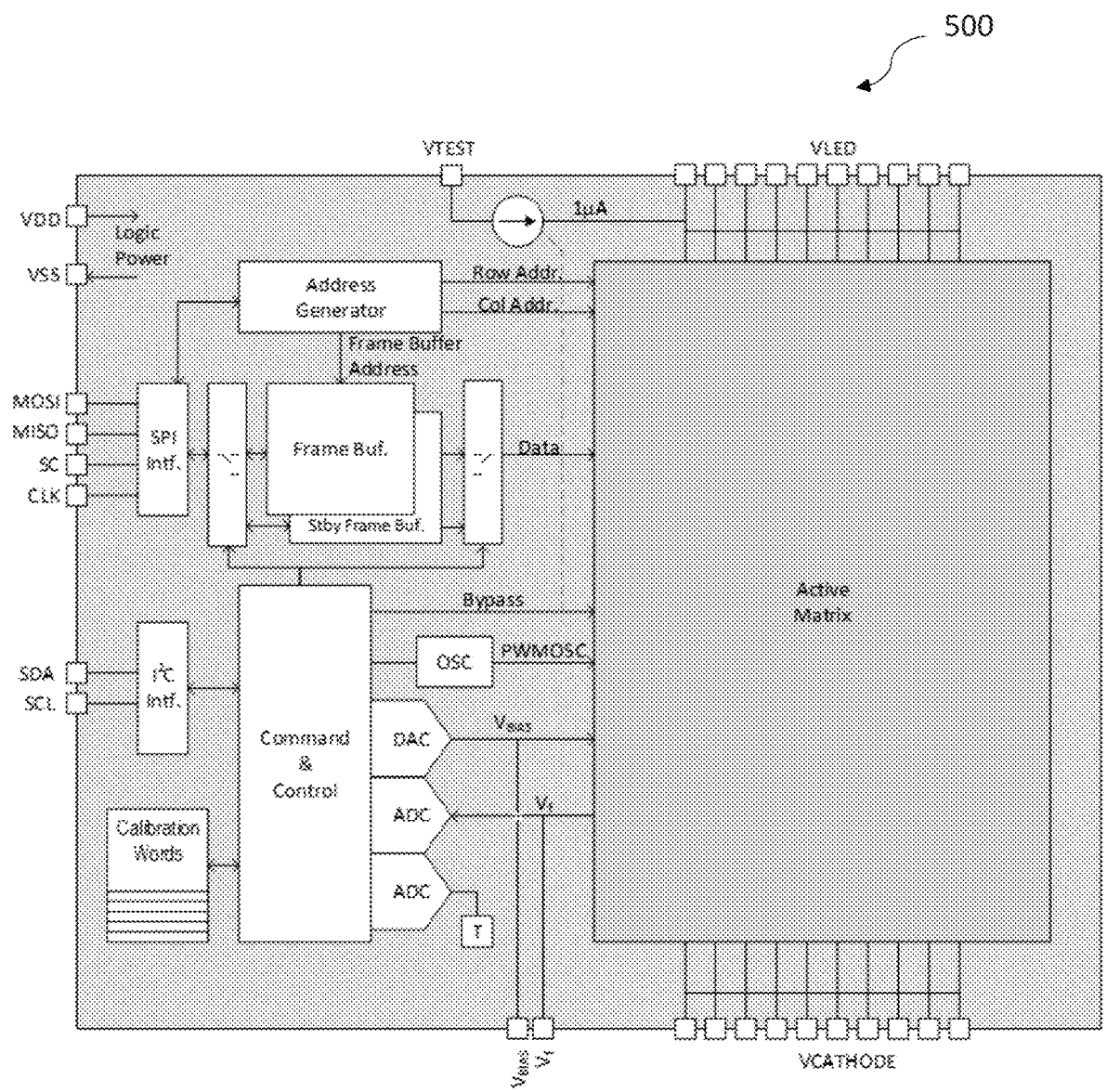
FIG. 5 is an illustration of a microcontroller assembly for an LED pixel array.

FIG. 5 illustrates a microcontroller assembly 500 for an LED pixel array. The assembly 500 can receive logic power via Vdd and Vss pins. An active matrix receives power for LED array control by multiple $V_{LED}$ and $V_{Cathode}$ pins. A Serial Peripheral Interface (SPI) can provide full duplex mode communication using a master-slave architecture with a single master. The master device originates the frame for reading and writing. Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface.

In one embodiment, the SPI frame includes 2 stop bits (both "0"), 10 data bits, MSB first, 3 CRC bits (x3+x+1), a start 111b, and target 000b. Timing can be set per SafeSPI "in-frame" standards.

MOSI Field data can be as follows:
Frame 0: Header
Frame 1/2: Start Column Address [SCOL]
Frame 3/4: Start Row Address [SROW}
Frame 5/6: Number of Columns [NCOL]
Frame 7/8: Number of Rows [NROW]
Frame 9: Intensity pixel [SCOL, SROW]
Frame 10: Intensity pixel [SCOL+1, SROW]
Frame 9+NCOL: Intensity pixel [SCOL+NCOL, SROW]
Frame 9+NCOL+1: Intensity pixel [SCOL, SROW+1]
Frame 9+NCOL+NROW: Intensity pixel [SCOL+NCOL, SROW+NROW]

MISO Field data can include loopback of frame memory.

A field refresh rate at 60 Hz (60 full frames per second) is supported, as is a bit rate of at least 10 Mbps, and typically between 15-20 Mbps.

The SPI interface connects to an address generator, frame buffer, and a standby frame buffer. Pixels can have parameters set and signals or power modified (e.g. by power gating before input to the frame buffer, or after output from the frame buffer via pulse width modulation or power gating) by a command and control module. The SPI interface can be connected to an address generation module that in turn provides row and address information to the active matrix. The address generator module in turn can provide the frame buffer address to the frame buffer.

The command and control module can be externally controlled via an Inter-Integrated Circuit ($I^2C$) serial bus. A clock (SCL) pin and data (SDA) pin with 7-bit addressing is supported.

The command and control module include a digital to analog converter (DAC) and two analog to digital converters (ADC). These are respectively used to set $V_{bias}$ for a connected active matrix, help determine maximum $V_f$, and determine system temperature. Also connected are an oscillator (OSC) to set the pulse width modulation oscillation (PWMOSC) frequency for the active matrix. A bypass line is also present to allow address of individual pixels or pixel blocks in the active matrix for diagnostic, calibration, or testing purposes.

In one embodiment, the command and control module can provide the following inputs and outputs:

Input to CMOS chip:

VBIAS: Sets voltage bias for LDO's.

GET_WORD[ . . . ]: Requests Output from CMOS.

TEST_M1: Run Pixel Test: LDO in bypass mode, sequentially addresses columns, then rows, outputs VF, using internal 1 µA source.

Vf values output via SPI.

TEST_M2: Run Pixel Test: LDO in bypass mode, sequentially addresses columns, then rows, outputs VF, using external I source.

Vf values output via SPI.

TEST_M3: LDO in bypass mode, addressing through I2C, using internal 1 µA source, Vf output via I2C.

TEST_M4: LDO in bypass mode, addressing through I2C, using external I source, Vf output via I2C.

BUFFER_SWAP: Swap to/from standby buffer.

COLUMN_NUM: Addresses a specific row.

ROW_NUM: Addresses a specific column.

Output from CMOS chip:

CW_PHIV_MIN, CW_PHIV_AVG, CW_PHIV_MAX: factory measured EOL global luminous flux data.

CW_VLED_MIN, CW_VLED_AVG, CW_VLED_MAX: factory measured EOL global forward voltage data.

CW_SERIALNO: die/CMOS combo serial number for traceability purposes.

TEMP_DIE: Value of Die Temperature.

VF: Value of Vf bus when being addressed with COLUMN_NUM and ROW_NUM.

BUFFER_STATUS: Indicates which buffer is selected.

Various calibration and testing methods for microcontroller assembly 500 are supported. During factory calibration a $V_f$ of all pixels can be measured. Maximum, minimum and average Vf of the active area can be "burned" as calibration frame. Maximum Vf and dVf/dT calibration frames can be used together with measured die temperature to determine actual $V_{LED}$ dynamically. Typically, a $V_{LED}$ of between 3.0V-4.5V is supported, with actual value being determined by feedback loop to external DC/DC converter such as described with respect to FIG. 3.

Figure 6A:
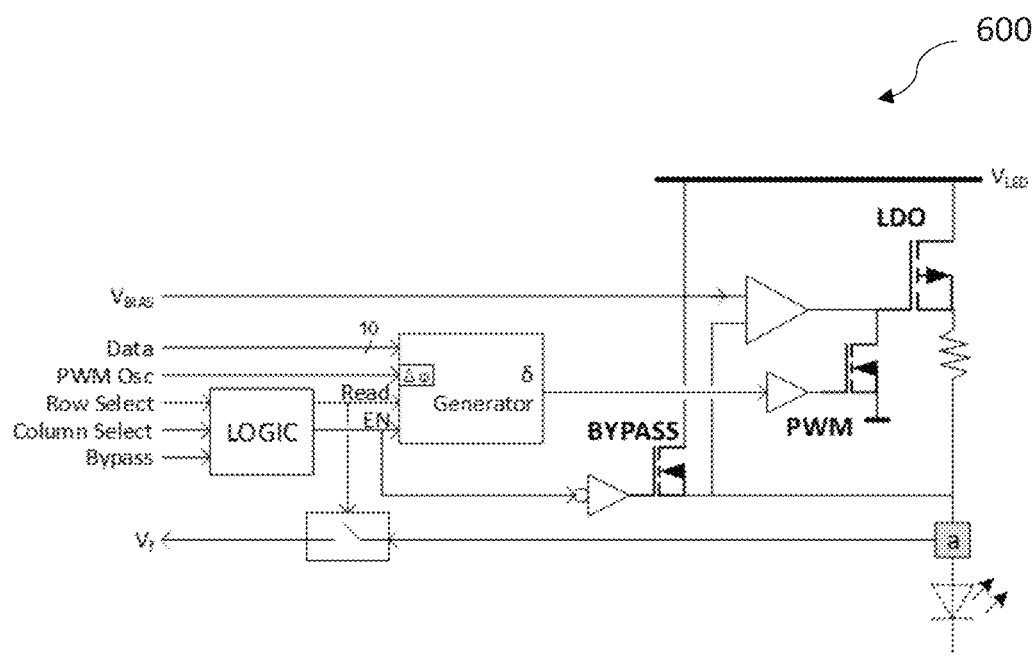
FIGS. 6A and 6B respectively illustrates an LDO bypass circuit for a pixel control circuit and gate timing diagram.
Figure 6B:
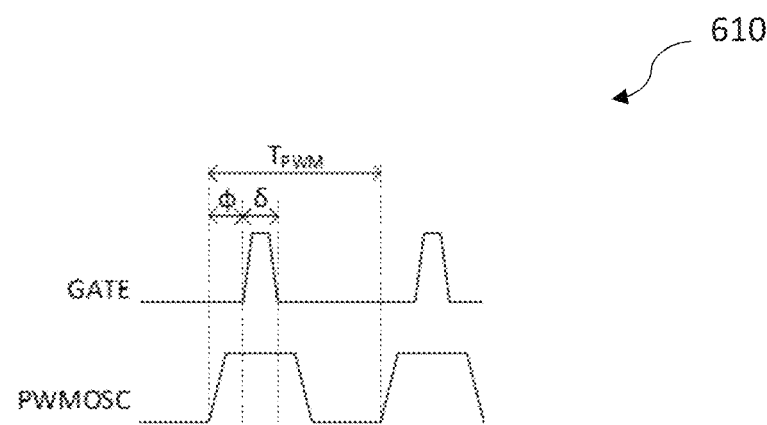

FIGS. 6A and 6B respectively illustrates one embodiment of a pixel control circuit 600 and associated timing diagram 610. Pixel control circuit 600 includes logic having row and column select, and a bypass signal. PWN OSC input and data, along with output from the logic are first fed into generator and then into a PWM. The PWM in turn has a duty cycle that controls activation of a particular pixel. This is described in more detail with respect to the following description of a pixel control circuit 630 of FIG. 6C. Factory calibration $V_f$ of all pixels can be measured at 1.0 µA and 1.0 mA using an external current source and LDO bypass functionality.

This operation can be bypassed when the LED pixel is supported by a low dropout (LDO) linear regulator as illustrated in the circuit 600. During bypass $V_f$ can be measured either with internal 1 µA current source or external current source on $V_{LED}$. Bypass can be done as a pixel by pixel operation using row and column select. Advantageously, this pixel bypass circuitry allows determination if a particular pixel is working correctly or if any fault situation has occurred.

As illustrated in FIG. 6B, image data and pulse width modulation oscillation clock data can be received by a pulse width modulator. Based on input from a logic module, gate timing including pulse start, ramp time and pulse duration/width (duty cycle) can be set on a per pixel basis. For example, the duty cycle (δ) can be loaded from frame buffer on "read". An 8-bit δ resolution can be supported. In one embodiment, the pulse leading-edge phase shift (φ) can be set differently for each pixel.

Figure 6C:
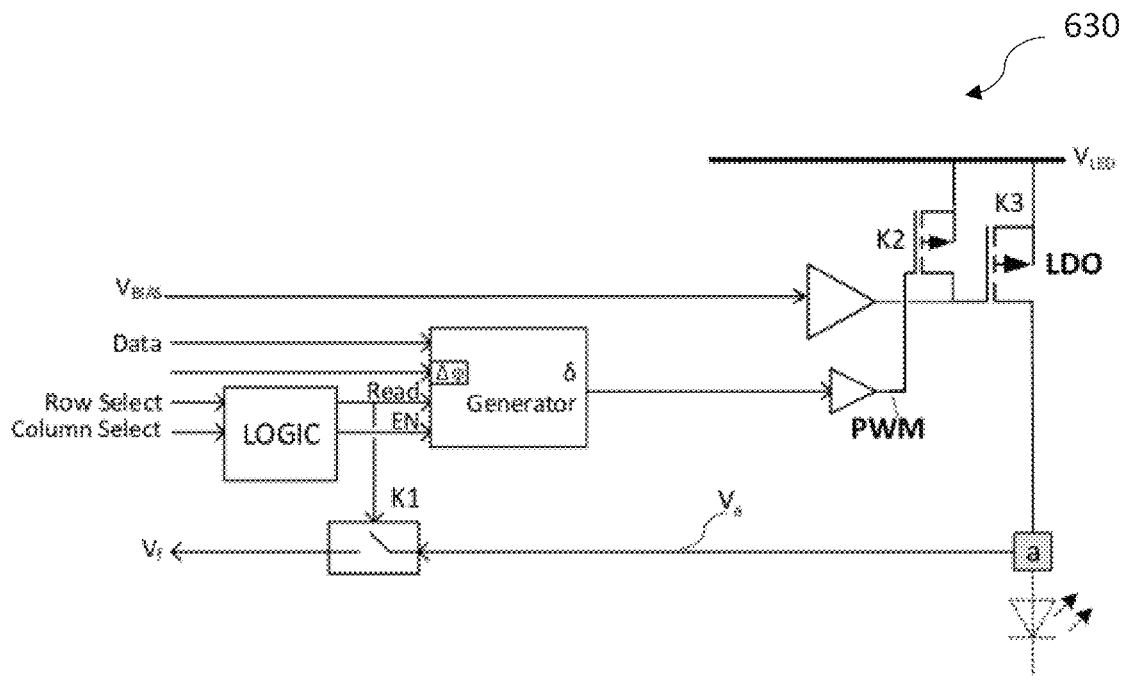
FIGS. 6C and 6D respectively illustrates an alternative pixel control circuit and gate timing diagram.

FIG. 6C illustrates a pixel control circuit 630 that does not support a bypass circuit. Pixel control circuit 630 includes logic having row and column select. Output from the logic are first fed into generator and then into a PWM. The PWM in turn has a duty cycle that controls activation of a particular pixel using additional circuitry in the following manner. Three switches, K1 through K3, are controlled by signals received from center control block outside pixels. Switch K3 is the current source, or LDO, and its current is controlled by Vbias. K2 is the PWM switch, which turns on and off based on the PWM duty cycle determined by the image data. In this example, K2 and K3 are P-channel MOSFet, but they can also be switches of any other suitable form. In FIG. 6C, the PWM signal is connected to the gate of K2, and the drain node of K2 is connected to the gate of K3. Consequently, when PWM signal is high, K2 is off and K3 is on, so the LED is on and the current is determined by Vbias voltage. When PWM is low, K2 is on, pulling K3 gate high and turning it off, so the LED is off.

Switch K1 is turned on and off based on row select and column select signal. K1 will be turned on only when the row and column of a specific pixel is selected, otherwise, it will stay off. When K1 is turned on, its impedance becomes low, and the LED forward voltage at the anode, or Va node of that pixel, will appear on the Vf bus. Since the impedance of Vf bus is much higher than that of K1 in the turn-on state, Vf voltage will equal to Va node voltage. When a fault situation happens in the circuit or the LED, the LED forward voltage may deviate from the normal value. Therefore, the Vf voltage can be used to determine if the pixel is working correctly or if any fault situation has occurred, without needing specific pixel bypass circuitry such as disclosed with respect to FIG. 6A. In this way, a real-time or "on-the-fly" detection can be realized such that the pixel status could be monitored and reported during operation.

Because the Vf bus is a shared node for all pixels, the K1 switch can be turned on for only one pixel at a time. The best time to detect fault situations would be when a pixel is turned on by the PWM. Preferably, the PWM values defined by the application image can be used for testing, but special test images may also be an option. When a pixel is turned off, the detection may still be done, although at a more limited level than during turn-on.

The K1 switching control with respect to the PWM can be flexible. Depending on detection requirements, the K1 frequency may be higher or lower than the PWM frequency. Apparently, the higher K1 frequency, the faster detection, i.e. the more pixels can be tested within a time range. E.g., if the PWM frequency is 500 Hz, only one pixel can be tested during one PWM period, or 2 ms, with a K1 frequency of 500 Hz, whereas ten pixels might be tested during 2 ms with a K1 frequency of 5000 Hz. Moreover, the two frequencies may be synchronous or asynchronous.

Figure 6D:
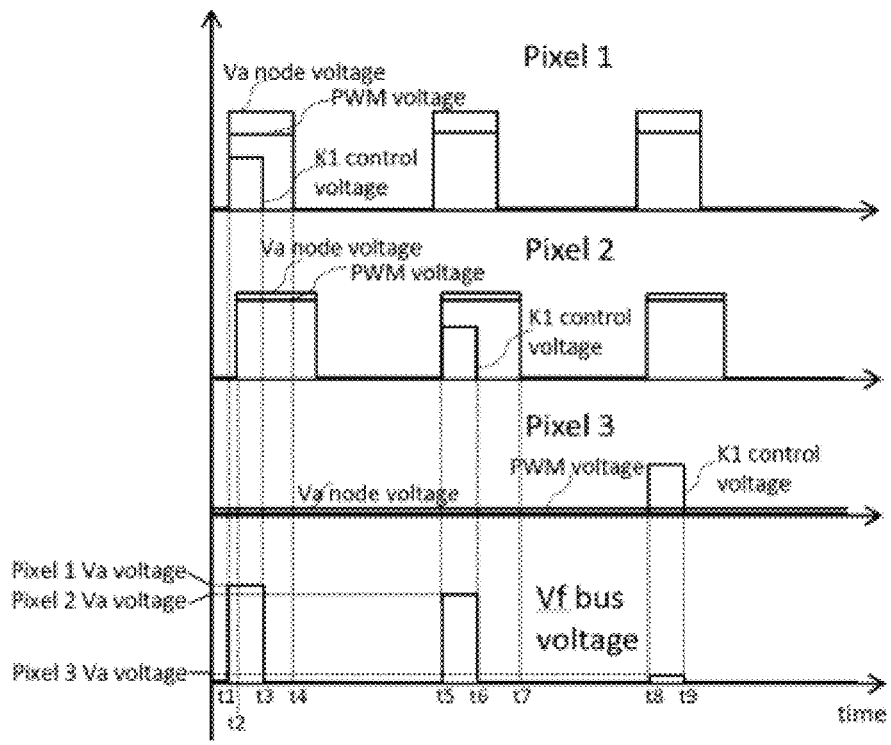

FIG. 6D illustrates an example control scheme for pixel control circuitry. In this embodiment, a K1 frequency is set close to PWM frequency with turn-on synchronized. Note that while this example only shows three pixels, it can be extended in a similar manner to a whole matrix array of pixels. For each pixel, the diagram shows the PWM signal voltage, Va node voltage and K1 control voltage. For a normal pixel, the Va node voltage is high when the PMM signal is high and low when the PWM is low. Likewise, the K1 is turned on when the K1 control voltage is high, and off when the control voltage is low. Depending on circuit design, control phase of PWM and K1 can be opposite, i.e. turning on the respective switch when low and turning it off when high.

Operation of pixel 1 proceeds as follows:

t1~t4: PWM voltage is high. The pixel is turned on and the Va node is high. In the meantime, the K1 control voltage is also high at t1, synchronized with the turn-on of PWM. K1 control voltage remains low for pixel 2 and 3. K1 of pixel 1 is turned on, and the Va node voltage appears on the Vf bus, so the Vf bus voltage equal to Va voltage of pixel 1 at this time. The turning-off moment of K1, t3, is earlier than that of the PWM, t4, so that the pixel test can complete before the pixel is turned off.

Operation of pixel 2 proceeds as follows:

At t2: PWM is high and the pixel is turned on. The slight lagging between t1 and t2 is the phase shift. At this moment, K1 of pixel 1 is still on, so K1 control voltage of pixel 2 is low and pixel 2 is not tested for this PWM cycle.

t5~t7: PWM is high and the pixel is turned on again at the second time. K1 control voltage is synchronized with pixel 2 at turn-on moment of t5 and stays on until t6. K1 control voltage remains low for other two pixels. Thus, the Vf bus voltage reflects the Va node voltage of pixel 2. In this example, the PWM duty cycle of pixel 2, which is the conduction or on time in percentage of the period or cycle time, is bigger than that of pixel 1. The Va voltage of pixel 2 is lower than that of pixel 1 when turned on.

Figure 7:
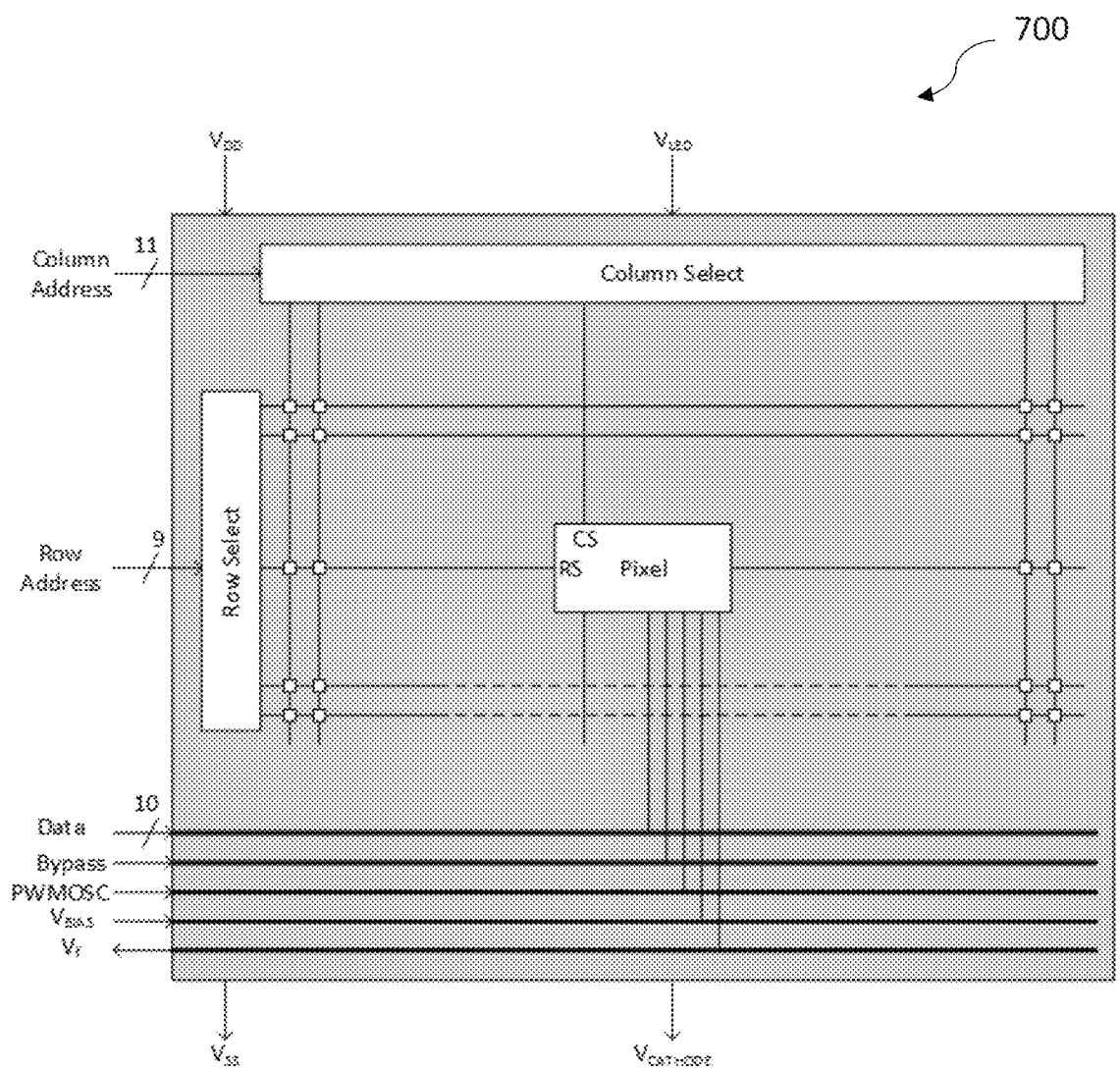
FIG. 7 illustrates an active matrix pixel array with row and column select supporting LDO bypass.

Operation of pixel 3 proceeds as follows:

PWM is low all the time. The pixel stays off and Va node voltage is low.

t8~t9: K1 control voltage is high for pixel 3 and low for other two pixels. Consequently, the Vf bus voltage represents the low Va voltage of pixel 3 at this time. The Va node voltage relation is:

FIG. 7 illustrate in more detail a block diagram 600 of active matrix array supporting LDO bypass. Row and column select are used to address individual pixels, which are supplied with a data line, a bypass line, a PWMOSC line, a $V_{bias}$ line, and a $V_f$ line. Timing and activation of a gate and pulse width modulator oscillator (PWMOSC) is illustrated with respect to FIG. 6B. As will appreciated, in certain embodiments LDO bypass is not required, and pixel testing can proceed using circuitry and/or control schemes described with respect to FIGS. 6C and 6D.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A light emitting diode (LED) controller for an LED pixel array, comprising:

a first switch activated in response to a row and column select signal;

a second switch activated in response to a pulse width modulation duty cycle; and a third switch for providing a current source from a bias voltage, pixel activation determined at least in part by a state of the first switch and the second switch, a LED pixel in the LED pixel array selected by the first switch, and a fault determination for the LED pixel made based on a determined forward voltage on a forward voltage bus.

2. The LED controller of claim 1, wherein the pulse width modulation duty cycle is determined by image data.

3. The LED controller of claim 1, wherein the second switch is a p-channel MOSFET.

4. The LED controller of claim 1, wherein the third switch controls a low dropout linear regulator.

5. The LED controller of claim 1, wherein the third switch is a p-channel MOSFET.

6. The LED controller of claim 1, wherein the forward voltage bus is shared by all LED pixels in the LED pixel array.

7. The LED controller of claim 1, wherein the first switch is switched faster than the pulse width modulation duty cycle.

8. The LED controller of claim 1, wherein the first switch is switched asynchronously with respect to the pulse width modulation duty cycle.

9. The LED controller of claim 1, wherein the first switch is switched synchronously with respect to the pulse width modulation duty cycle.

10. The LED controller of claim 1, wherein a control phase of the first switch is opposite to a control phase of the pulse width modulation duty cycle.

11. A light emitting diode (LED) controller for an LED pixel array, comprising:

logic for providing a row and column select signal;

a pulse width modulator having a duty cycle;

a pulse width modulation (PWM) switch activated based on the duty cycle, the PWM switch having a first terminal and a second terminal, the first terminal of the PWM switch connected to power;

a regulation switch having a gate, a first terminal, and a second terminal, the first terminal of the regulation switch connected to power, the gate of the regulation switch connected to the second terminal of the PWM switch; and a LED pixel in the LED pixel array that is activated at least in part according to a state of the row and column select signal and the regulation switch, wherein a fault determination for the LED pixel made based on a determined forward voltage on a forward voltage bus.

12. The LED controller of claim 11, wherein the pulse width modulator duty cycle is determined by image data.

13. The LED controller of claim 11, wherein the forward voltage bus is shared by all LED pixels in the LED pixel array.

14. The LED controller of claim 11, wherein the determined forward voltage on the forward voltage bus occurs faster than the pulse width modulation duty cycle.

15. The LED controller of claim 11, wherein the determined forward voltage on the forward voltage bus occurs asynchronously with respect to the pulse width modulation duty cycle.

16. The LED controller of claim 11, wherein the determined forward voltage on the forward voltage bus occurs synchronously with respect to the pulse width modulation duty cycle.

17. The LED controller of claim 11, wherein a control phase of the determined forward voltage on the forward voltage bus occurs opposite to a control phase of the pulse width modulation duty cycle.

18. A light emitting diode (LED) controller for an LED pixel array, comprising:
- a first switch for being activated in response to row and column select signals;
- a pulse width modulator that receives image data and generates a pulse width modulation signal having a duty cycle;
- a second switch for being activated in response to the duty cycle; and
- a third switch for providing a current source to an LED pixel in the LED pixel array, the third switch controlled by a bias voltage, the pixel activation determined at least in part by a state of the first switch and the second switch, the first switch configured to select the LED pixel in the LED pixel array, and
- the first switch having a first terminal connected to a forward voltage bus and a second terminal connected to the LED pixel in the LED pixel array.

19. The LED controller of claim 18, wherein the second switch is a p-channel MOSFET, the third switch is a p-channel MOSFET, and a drain node of the second switch is connected to a gate of the third switch.

20. The LED controller of claim 19, wherein a source node of the second switch is connected to a power rail, a source node of the third switch is connected to the power rail, and a drain node of the third switch is connected to the LED pixel.

* * * * *